United States Patent
Demetrio et al.

(10) Patent No.: US 10,315,711 B2
(45) Date of Patent: Jun. 11, 2019

(54) VEHICLE RIDE-HEIGHT DEPENDENT CONTROL OF AIR DEFLECTOR

(71) Applicant: GM GLOBAL TECHNOLOGY OPERATIONS LLC, Detroit, MI (US)

(72) Inventors: Timothy D. Demetrio, Highland, MI (US); Caleb Potvin, Sterling Heights, MI (US); Rebecca Tjoelker, Commerce Charter Township, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 153 days.

(21) Appl. No.: 15/659,245

(22) Filed: Jul. 25, 2017

(65) Prior Publication Data

US 2019/0031252 A1    Jan. 31, 2019

(51) Int. Cl.
*B62D 35/02* (2006.01)
*B62D 35/00* (2006.01)
*B60G 17/0165* (2006.01)

(52) U.S. Cl.
CPC ....... *B62D 35/005* (2013.01); *B60G 17/0165* (2013.01); *B62D 35/02* (2013.01)

(58) Field of Classification Search
CPC ... B62D 35/02; B62D 35/005; B60G 17/0165
USPC ........................................... 296/180.5, 180.1
See application file for complete search history.

(56) References Cited

U.S. PATENT DOCUMENTS

| | | | |
|---|---|---|---|
| 4,810,022 A * | 3/1989 | Takagi | B62D 35/005 296/180.5 |
| 5,593,176 A * | 1/1997 | Campbell | B60G 11/26 280/124.102 |
| 9,004,499 B2 * | 4/2015 | Zeweke | B60G 17/00 280/5.514 |
| 9,713,947 B2 * | 7/2017 | Irwin | B60G 17/0165 |
| 2012/0153581 A1 * | 6/2012 | Li | B62D 35/005 280/5.514 |
| 2013/0238198 A1 * | 9/2013 | Prentice | B62D 35/02 701/49 |
| 2016/0016448 A1 * | 1/2016 | Luttinen | B60G 7/006 280/5.514 |
| 2016/0229467 A1 * | 8/2016 | Miller | B62D 35/005 |
| 2017/0088197 A1 * | 3/2017 | Heil | B62D 35/005 |
| 2017/0120968 A1 * | 5/2017 | Povinelli | B62D 35/005 |
| 2017/0158259 A1 * | 6/2017 | Fahland | B62D 37/02 |
| 2017/0158262 A1 * | 6/2017 | Shami | B62D 35/005 |

(Continued)

*Primary Examiner* — Jason S Morrow
(74) *Attorney, Agent, or Firm* — Quinn IP Law

(57) ABSTRACT

A system is configured to control aerodynamics of a vehicle. The vehicle includes a vehicle body having a first end facing an ambient airflow when the vehicle is in motion relative to a road surface and a second end arranged opposite the first end. The system includes an air deflector moveably mounted to the vehicle body. The system also includes a mechanism configured to selectively vary a height of the deflector relative to the road surface and a position of the deflector relative to the vehicle body. The system additionally includes a controller configured to determine a ride-height of the vehicle and correlate the determined vehicle ride-height to a target height of the deflector relative to the road surface. The controller is further configured to regulate the mechanism to select the target height of the deflector relative to the road surface to thereby control the aerodynamics of the vehicle.

20 Claims, 2 Drawing Sheets

(56) References Cited

U.S. PATENT DOCUMENTS

2017/0267294 A1* 9/2017 Klop ................... B62D 35/005
2018/0162459 A1* 6/2018 Abdoul Azizou ...... H02P 6/182
2018/0297647 A1* 10/2018 Klop ................... B62D 35/005
2019/0002039 A1* 1/2019 Cha .................... B62D 35/005

* cited by examiner

VEHICLE RIDE-HEIGHT DEPENDENT CONTROL OF AIR DEFLECTOR

INTRODUCTION

The disclosure relates to control of a vehicle air deflector position based on the vehicle's ride-height for controlling the vehicle's aerodynamics.

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. The study is typically used to shape vehicle bodywork along with employing dedicated aerodynamic devices for achieving a desired compromise among the above characteristics for specific vehicle use. Additionally, the study of aerodynamics may also be used to achieve downforce in vehicles in order to improve vehicle traction, high speed stability, and cornering.

SUMMARY

A system is configured to control aerodynamics of a vehicle. The vehicle includes a vehicle body having a first vehicle body end facing an ambient airflow when the vehicle is in motion relative to a road surface and a second vehicle body end arranged opposite the first end. The system includes an air deflector moveably mounted to the vehicle body proximate the first vehicle body end. The system also includes a mechanism configured to selectively vary a height of the air deflector relative to the road surface and a position of the air deflector relative to the vehicle body to thereby control a movement of the ambient airflow relative the vehicle body. The system additionally includes a controller configured to determine a ride-height of the vehicle, i.e., a height of the vehicle body relative to the road surface, and correlate the determined ride-height of the vehicle to a target height of the air deflector relative to the road surface. The controller is further configured to regulate the mechanism to select the target height of the air deflector relative to the road surface to thereby control the aerodynamics of the vehicle.

The controller may be programmed with a look-up table including the determined ride-height of the vehicle corresponding to the target height of the air deflector relative to the road surface. In such an embodiment, the controller may be configured to correlate the determined ride-height of the vehicle to the target height of the air deflector relative to the road surface via the look-up table.

The controller may be configured to determine the target height of the air deflector relative to the road surface via an interpolation between discrete ride-height data points and between discrete target height of the air deflector data points in the look-up table.

The controller may be configured to detect the height of the vehicle body at the first vehicle body end and/or at the second vehicle body end. The look-up table may establish a correlation between the detected height of the vehicle body at the first vehicle body end and/or at the second vehicle body end and the target height of the air deflector relative to the road surface.

The controller may also be configured to determine the ride-height of the vehicle at each of the first vehicle body end and the second vehicle body end, determine a pitch of the vehicle body relative to the road surface based on a difference between the ride-height of the vehicle at the first vehicle body end and the ride-height of the vehicle at the second vehicle body end, and select the target height of the air deflector relative to the road surface corresponding to the determined pitch of the vehicle body.

The vehicle may include a road wheel and a vehicle suspension corner operatively connecting the vehicle body to the road wheel. The vehicle may also include a sensor arranged at the suspension corner, and configured to detect a height of the vehicle body relative to the road surface and generate a signal indicative of the detected height of the vehicle body relative to the road surface. In such an embodiment, the controller may be configured to receive the signal from the sensor and determine the ride-height of the vehicle using the received signal.

The controller may be configured to use the road surface as a reference surface for determining the ride-height of the vehicle, and the sensor may be configured to detect the ride-height of the vehicle via directly sensing the height of the vehicle body relative to the road surface.

The sensor may be one of an ultrasonic sensor and a laser sensor.

The mechanism may be configured to selectively pivot the air deflector relative to the vehicle body to thereby vary the height of air deflector relative to the road surface and a position of the air deflector relative to the vehicle body.

The controller may be configured to determine a road speed of the vehicle and regulate the ride-height of the vehicle in correlation with the determined road speed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
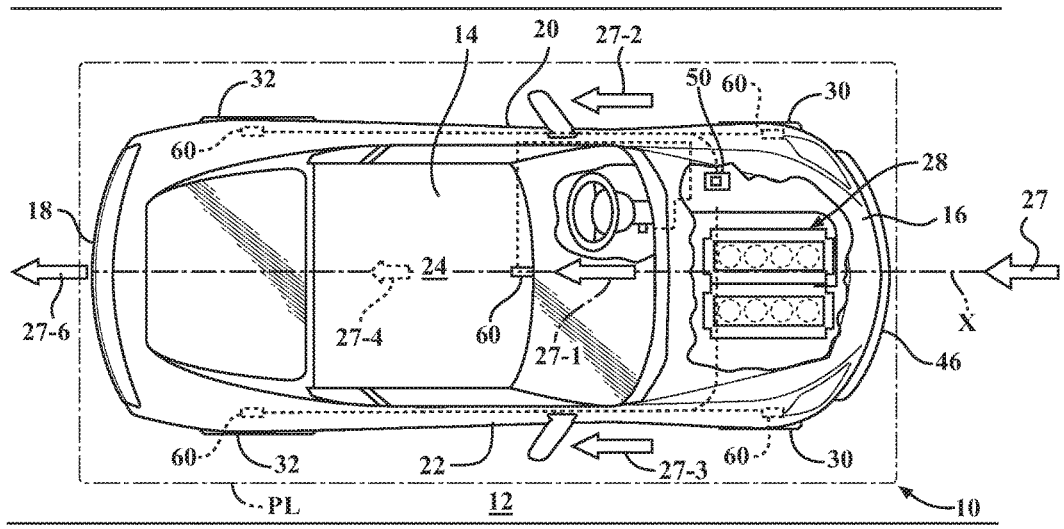
FIG. 1 is a schematic top view of a vehicle having its vehicle body arranged in a body plane and along a longitudinal axis, and having a system configured to control aerodynamics of the vehicle via a moveable air deflector in correlation with a determined vehicle ride-height according to the disclosure.
Figure 3:
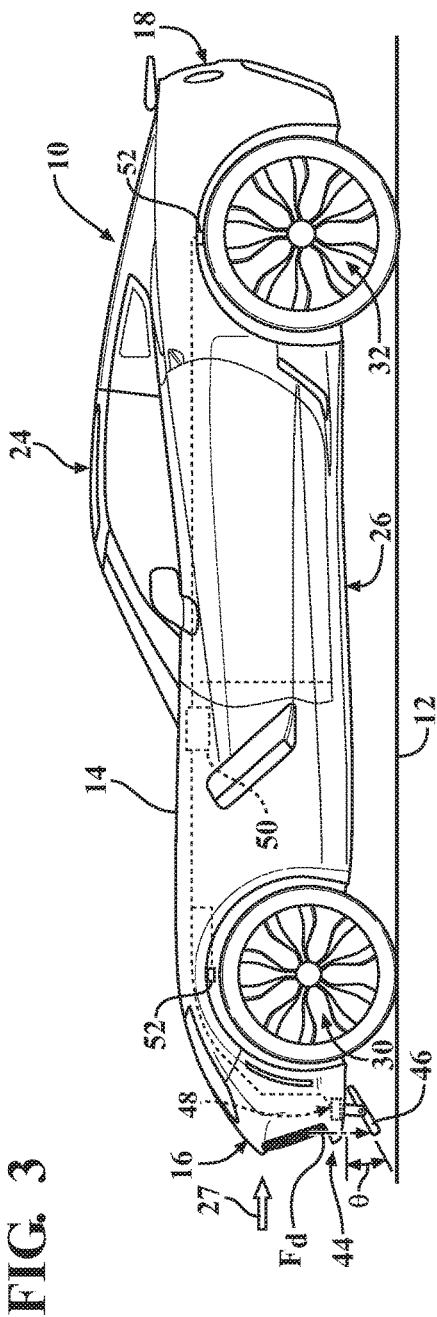
FIG. 3 is a schematic side view of the vehicle shown in FIG. 1 in level position according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane PL that is substantially parallel to the road surface 12 when the vehicle is stationary. The vehicle body 14 defines six body sides. The six body sides include a first body end or front end 16, a second body end or rear end 18 arranged opposite the front end, a first lateral body side or left side 20, a second lateral body side or right side 22, and a top body portion 24, which may include a vehicle roof, all shown in FIG. 1, and an underbody portion 26 shown in FIGS. 3 and 4.

The left side 20 and right side 22 are disposed generally parallel to each other and with respect to the longitudinal axis X, and span the distance between the front end 16 and the rear end 18. The body plane PL is defined to include the longitudinal axis X. A passenger compartment (not shown) of the vehicle 10 is generally bounded by the front and rear ends 16, 18 and the left and right sides 20, 22 of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane PL and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in phantom in FIG. 1) passes under the vehicle body 14 between the underbody portion 26 and the road surface 12. The recirculating airflow region 27-6 is generally caused at elevated vehicle speeds by the flow of surrounding air around the six body sides of the vehicle body 14

Figure 2:
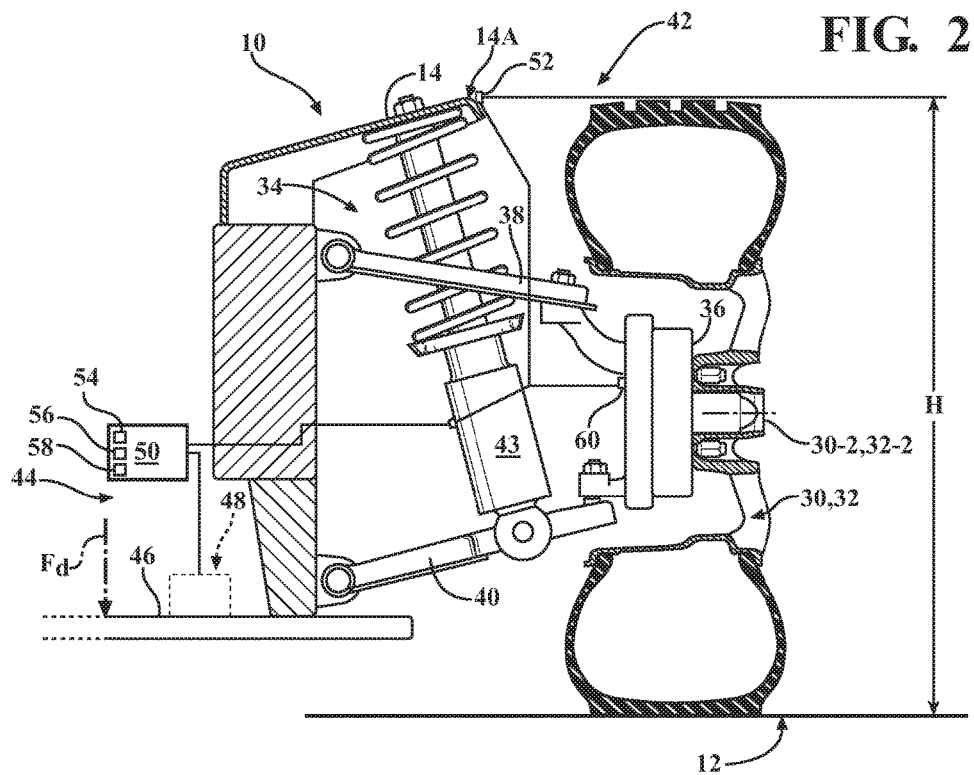
FIG. 2 is an enlarged schematic cross-sectional illustration of a representative suspension corner of the vehicle shown in FIG. 1, depicting detection of vehicle ride-height at the suspension corner and selection of target height of the air deflector according to the disclosure.

As shown in FIG. 1, the vehicle 10 also includes a plurality of road wheels that include front wheels 30 and rear wheels 32. Each road wheel 30, 32 may have a pneumatic tire mounted thereon. Although four wheels, i.e., a pair of front wheels 30 and a pair of rear wheels 32, are shown in FIG. 1, a vehicle with fewer or greater number of wheels is also envisioned. As shown in FIG. 2, a vehicle suspension system 34 operatively connects the body 14 to the front and rear wheels 30, 32 for maintaining contact between the wheels and a road surface 12, and for maintaining handling of the vehicle. The suspension system 34 includes a plurality of knuckles 36, each configured to support a respective road wheel 30, 32 via a wheel hub 30-2, 32-2 and bearing assembly (not shown). As shown, each knuckle 36 may be operatively connected to the body 14 via an upper control arm 38 and a lower control arm 40. FIG. 2 depicts a representative suspension corner 42 existing at each left and right front road wheel 30 and left and right rear road wheel 32 of the suspension system 34, each of which includes a representative knuckle 36, and may include each of the control arms 38 and 40. Each vehicle suspension corner 42 operatively connects the vehicle body 14 to the respective road wheel 30, 32. Other suspension designs, rather then the one depicted in FIG. 2, employing individual and distinct corners at specific road wheels are also envisioned.

The vehicle 10 is typically characterized by a height of the vehicle body 14 relative to the road surface 12, typically termed as "vehicle ride-height" and designated herein as "H". As may be seen in FIG. 2, in general, vehicle ride-height H specifies a vertical position of the vehicle body 14 with respect to the road surface 12. The ride-height H of the vehicle 10 may be determined individually at each suspension corner 42 from a specific point 14A on a selected surface of the vehicle body 14 to the road surface 12. The vehicle 10 additionally includes an actuator 43 configured to establish the ride height H of the vehicle 10 at one of the front end 16 and the rear end 18. The vehicle 10 also includes a system 44 for controlling aerodynamics of the vehicle 10. The system 44 includes an air deflector 46 moveably mounted to the vehicle body 14 proximate the front end 16. The system 44 also includes a mechanism 48 configured to selectively vary a height of the air deflector 46 relative to the road surface 12 and a position of the air deflector relative to the vehicle body 14 to thereby control a movement of the ambient airflow 27, and specifically the fourth airflow portion 27-4, relative the vehicle body.

The mechanism 48 may be configured to selectively pivot or rotate the air deflector 46 about a pivot axis Y that is transverse to the longitudinal axis X, and thereby vary an angle $\theta$ (shown in FIG. 3) of the air deflector relative to the vehicle body 14. Alternatively, the mechanism 48 may be configured to selectively extend the air deflector 46 toward and retract the air deflector away from the road surface 12 by translating the deflector up or down relative to the vehicle body 14. In either embodiment, the mechanism 48 is configured to vary the height of air deflector 46 relative to the road surface 12 and a position of the air deflector relative to the vehicle body 14. The mechanism 48 may include an electric motor or another type of an actuator configured to reposition and adjust the air deflector 46 relative to the vehicle body 14.

The vehicle 10 additionally includes a controller 50. The controller 50 may be configured as a central processing unit (CPU) programmed to regulate operation of the powerplant 28, as well as other vehicle systems, such as to command the actuator 43 to establish the ride-height H of the vehicle 10, or a dedicated controller. In order to appropriately control operation of the particular vehicle systems, the controller 50 includes a memory, at least some of which is tangible and non-transitory. The memory may be a recordable medium that participates in providing computer-readable data or process instructions. Such a medium may take many forms, including but not limited to non-volatile media and volatile media.

Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a flexible disk, hard disk, magnetic tape, other magnetic medium, a CD-ROM, DVD, other optical medium, etc. The controller 50 may be configured or equipped with other required computer hardware, such as a high-speed clock, requisite Analog-to-Digital (A/D) and/or Digital-to-Analog (D/A) circuitry, necessary input/output circuitry and devices (I/O), as well as appropriate signal conditioning and/or buffer circuitry. Algorithms required by the controller 50 or accessible thereby may be stored in the respective memory and automatically executed to provide the required functionality.

The controller 50 is also configured or programmed to determine the ride-height H of the vehicle 10. Such a determination by the controller 50 may be made via using a detected height of the vehicle body 14 at one or more specific reference points relative to the road surface 12. For example, individual sensors 52 may be used to directly detect the height of the vehicle body 14 relative to the road surface 12, such as via using the road surface 12 as a reference surface for determining the ride-height H of the vehicle 10. Alternatively, individual sensors 52 may be used to determine the ride-height H of the vehicle 10 indirectly via a correlated measurement to some predetermined point on the suspension corner 42, such as on the upper control arm 38 or on the lower control arm 40. Each such sensor 52 may be arranged on the vehicle body 14 at or proximate to the individual suspension corner 42 and generate a signal indicative of the detected height of the vehicle body. The sensor 52 may, for example, be either an ultrasonic sensor or a laser sensor. In such an embodiment, the controller 50 may be configured to receive the signal from each of the sensors 52 and determine the ride-height H of the vehicle 10 using the received signal. Accordingly, the controller 50 may be programmed to determine the ride-height H of the vehicle 10 separately at the front end 16 and at the rear end 18.

The controller 50 is also configured to correlate the determined ride-height H of the vehicle 10 to a target height 54 of the air deflector 46 relative to the road surface 12 and the position of the air deflector relative to the vehicle body 14. The target height 54 may be defined as a height of the air deflector 46 which provides an optimized amount of downforce $F_d$ (shown in FIGS. 2-4) or aerodynamic drag on the vehicle body 14 at a particular ride-height H of the vehicle 10. Additionally, the target height 54 may also take into account a required clearance between the air deflector 46 and the road surface 12 to reduce likelihood of damage to the air deflector. Furthermore, the controller 50 is configured to regulate the mechanism 48 in response to the determined ride-height H of the vehicle 14 to select the target height 54 of the air deflector 46. Such regulation of position of the air deflector 46 is intended to generally control the aerodynamics of the vehicle 10, and specifically the downforce $F_d$ (shown in FIGS. 2-4) on the vehicle body 14.

The controller 50 may specifically be programmed with a look-up table 56 including the determined ride-height H of the vehicle 10 corresponding to the target height 54 of the air deflector 46 relative to the road surface 12. The controller 50 may also be programmed to correlate the determined ride-height H of the vehicle 10 to the target height 54 of the air deflector 46 relative to the road surface 12 via the look-up table 56. Furthermore, the controller 50 may be configured to determine the target height 54 of the air deflector relative to the road surface 12 via an interpolation between discrete ride-height position data points and between discrete target height of the air deflector data points recorded in the look-up table 56. The correlation between available ride-heights H and target height 54 positions of the air deflector 46 recorded in the look-up table 56 may be established empirically, during development and testing of a control vehicle representative of the subject vehicle 10.

Figure 4:
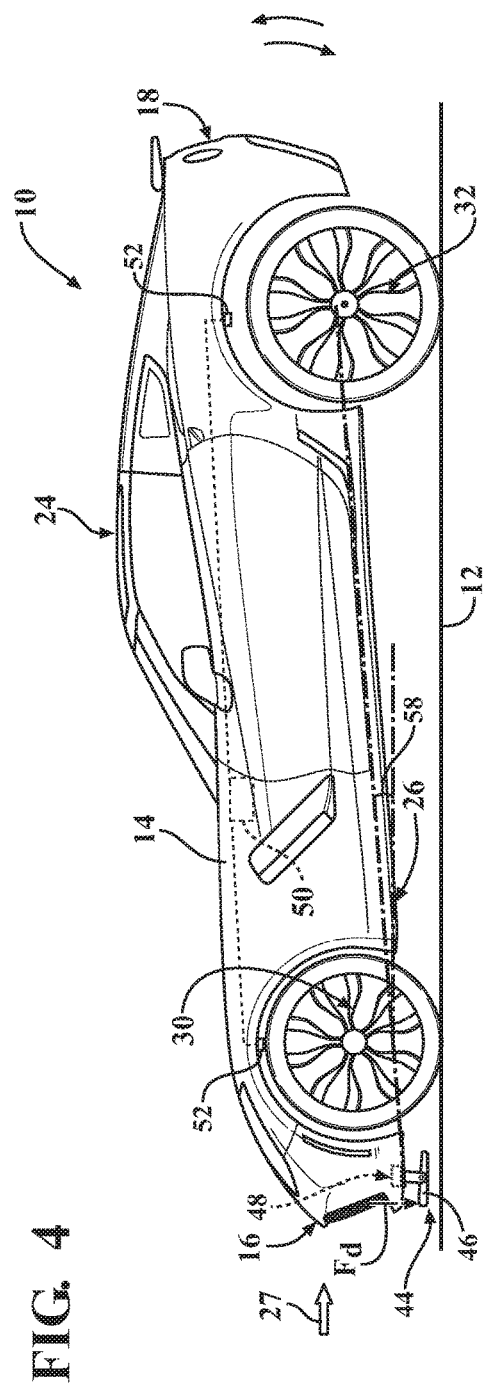
FIG. 4 is a schematic side view of the vehicle shown in FIG. 3, illustrating pitch directions according to the disclosure, and showing the vehicle in a specific pitched forward position.

As noted above, the controller 50 may be configured to detect the height of the vehicle body 14 at the front end 16 and/or at the rear end 18. The look-up table 56 may be structured to establish a correlation between the detected height of the vehicle body 14 at the front end 16 and/or at the rear end 18 and the target height 54 of the air deflector 46 relative to the road surface 12. The controller 50 may also be configured to determine a pitch 58 of the vehicle body 14 relative to the road surface 12 based on a difference between the ride-height H of the vehicle at the front end 16 and the ride-height H of the vehicle 14 at the rear end 18, as shown in FIG. 4. The determined pitch 58 may be a result of specifically selected ride-height H that is different at the front end 16 versus the rear end 18, or a result of dynamic behavior of the vehicle 10, such as during braking (shown in FIG. 4) or acceleration. The controller 50 may be additionally configured select the target height 54 of the air deflector 46 relative to the road surface 12 corresponding to the determined pitch 58 of the vehicle body 14.

As shown in FIG. 4, the system 44 may include a sensor 60 configured to detect a vehicle dynamic parameter indicative of a road speed of the vehicle 10. For example, such a sensor 60 may be configured to detect a rotating speed of a particular road wheel 30 or 32 and communicate the detected rotating speed to the controller 50 (shown in FIGS. 1-4). Alternatively, the sensor 60 may be configured to detect a velocity of ambient airflow 27 relative to the vehicle 10, and similarly communicate the detected ambient airflow velocity to the controller 50 (shown in FIG. 1). The controller 50 may be configured to determine a road speed of the vehicle 10 based on either the detected rotating speed of the road wheel 30 or 32 or the detected airflow velocity and regulate the ride-height H of the vehicle in correlation with the determined road speed. The look-up table 56 may further include a correlation between the detected road speed of the vehicle 10, the ride-height H, and the target height 54 of the air deflector 46 relative to the road surface 12. Such a correlation in the look-up table 56 may be used by the controller 50 to further reduce aerodynamic drag on the vehicle body 14 at elevated road speeds or increase the magnitude of the downforce $F_d$, via controlling the height of the air deflector relative to the road surface 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling aerodynamics of a vehicle, wherein the vehicle includes a vehicle body arranged along a longitudinal axis and having a first vehicle body end configured to face oncoming ambient airflow when the vehicle is in motion relative to a road surface and a second vehicle body end arranged opposite the first vehicle body end, the system comprising:
   an air deflector moveably mounted to the vehicle body proximate the first vehicle body end;
   a mechanism configured to selectively vary a height of the air deflector relative to the road surface and a position of the air deflector relative to the vehicle body to thereby control a movement of the ambient airflow relative the vehicle body; and
   a controller configured to:
      determine a ride-height of the vehicle;

correlate the determined ride-height of the vehicle to a target height of the air deflector relative to the road surface; and regulate the mechanism to select the target height of the air deflector relative to the road surface to thereby control the aerodynamics of the vehicle.

2. The system according to claim 1, wherein the controller is programmed with a look-up table including the determined ride-height of the vehicle corresponding to the target height of the air deflector relative to the road surface, and the controller is configured to correlate the determined ride-height of the vehicle to the target height of the air deflector relative to the road surface via the look-up table.

3. The system according to claim 2, wherein the controller is configured to determine the target height of the air deflector relative to the road surface via an interpolation between discrete ride-height data points and between discrete target height of the air deflector data points in the look-up table.

4. The system according to claim 2, wherein the controller is configured to detect the height of the vehicle body at the first vehicle body end and/or at the second vehicle body end, and wherein the look-up table establishes a correlation between the detected height of the vehicle body at the first vehicle body end and/or at the second vehicle body end and the target height of the air deflector relative to the road surface.

5. The system according to claim 4, wherein the controller is configured to:

determine the ride-height of the vehicle at each of the first vehicle body end and the second vehicle body end;

determine a pitch of the vehicle body relative to the road surface based on a difference between the ride-height of the vehicle at the first vehicle body end and the ride-height of the vehicle at the second vehicle body end; and select the target height of the air deflector relative to the road surface corresponding to the determined pitch of the vehicle body.

6. The system according to claim 1, wherein:

the vehicle includes a road wheel and a vehicle suspension corner operatively connecting the vehicle body to the road wheel;

a sensor arranged at the suspension corner, and configured to detect a height of the vehicle body relative to the road surface and generate a signal indicative of the detected height of the vehicle body relative to the road surface; and the controller is configured to receive the signal from the sensor and determine the ride-height of the vehicle using the received signal.

7. The system according to claim 6, wherein:

the controller is configured to use the road surface as a reference surface for determining the ride-height of the vehicle; and the sensor is configured to detect the ride-height of the vehicle via directly sensing the height of the vehicle body relative to the road surface.

8. The system according to claim 6, wherein the sensor is one of an ultrasonic sensor and a laser sensor.

9. The system according to claim 1, wherein the mechanism is configured to selectively pivot the air deflector relative to the vehicle body to thereby vary the height of air deflector relative to the road surface and a position of the air deflector relative to the vehicle body.

10. The system according to claim 1, wherein the controller is configured to determine a road speed of the vehicle and regulate the ride-height of the vehicle in correlation with the determined road speed.

11. A vehicle comprising:

a vehicle body arranged along a longitudinal axis and having a first vehicle body end configured to face oncoming ambient airflow when the vehicle is in motion relative to a road surface;

a second vehicle body end arranged opposite the first vehicle body end;

an air deflector moveably mounted to the vehicle body proximate the first vehicle body end;

a mechanism configured to selectively vary a height of the air deflector relative to the road surface and a position of the air deflector relative to the vehicle body to thereby control a movement of the ambient airflow relative the vehicle body; and a controller configured to:

determine a ride-height of the vehicle;

correlate the determined ride-height of the vehicle to a target height of the air deflector relative to the road; and regulate the mechanism to select the target height of the air deflector relative to the road surface to thereby control the aerodynamics of the vehicle.

12. The vehicle according to claim 11, wherein the controller is programmed with a look-up table including the determined ride-height of the vehicle corresponding to the target height of the air deflector relative to the road surface, and the controller is configured to correlate the determined ride-height of the vehicle to the target height of the air deflector relative to the road surface via the look-up table.

13. The vehicle according to claim 12, wherein the controller is configured to determine the target height of the air deflector relative to the road surface via an interpolation between discrete ride-height data points and between discrete target height of the air deflector data points in the look-up table.

14. The vehicle according to claim 12, wherein the controller is configured to detect the height of the vehicle body at the first vehicle body end and/or at the second vehicle body end, and wherein the look-up table establishes a correlation between the detected height of the vehicle body at the first vehicle body end and/or at the second vehicle body end and the target height of the air deflector relative to the road surface.

15. The vehicle according to claim 4, wherein the controller is configured to:

determine the ride-height of the vehicle at each of the first vehicle body end and the second vehicle body end;

determine a pitch of the vehicle body relative to the road surface based on a difference between the ride-height of the vehicle at the first vehicle body end and the ride-height of the vehicle at the second vehicle body end; and select the target height of the air deflector relative to the road surface corresponding to the determined pitch of the vehicle body.

16. The vehicle according to claim 11, further comprising:

a road wheel and a vehicle suspension corner operatively connecting the vehicle body to the road wheel; and a sensor arranged at the suspension corner, and configured to detect a height of the vehicle body relative to the road surface and generate a signal indicative of the detected height of the vehicle body relative to the road surface;

wherein the controller is configured to receive the signal from the sensor and determine the ride-height of the vehicle using the received signal.

17. The vehicle according to claim 16, wherein:
the controller is configured to use the road surface as a reference surface for determining the ride-height of the vehicle; and
the sensor is configured to detect the ride-height of the vehicle via directly sensing the height of the vehicle body relative to the road surface.

18. The vehicle according to claim 16, wherein the sensor is one of an ultrasonic sensor and a laser sensor.

19. The vehicle according to claim 11, wherein the mechanism is configured to selectively pivot the air deflector relative to the vehicle body to thereby vary the height of air deflector relative to the road surface and a position of the air deflector relative to the vehicle body.

20. The vehicle according to claim 11, wherein the controller is configured to determine a road speed of the vehicle and regulate the ride-height of the vehicle in correlation with the determined road speed.

\* \* \* \* \*